April 12, 1966 R. C. DE BLOOIS ETAL 3,245,156
AUDIO-VISUAL DISPLAY SYSTEM
Filed Sept. 23, 1963 2 Sheets-Sheet 1
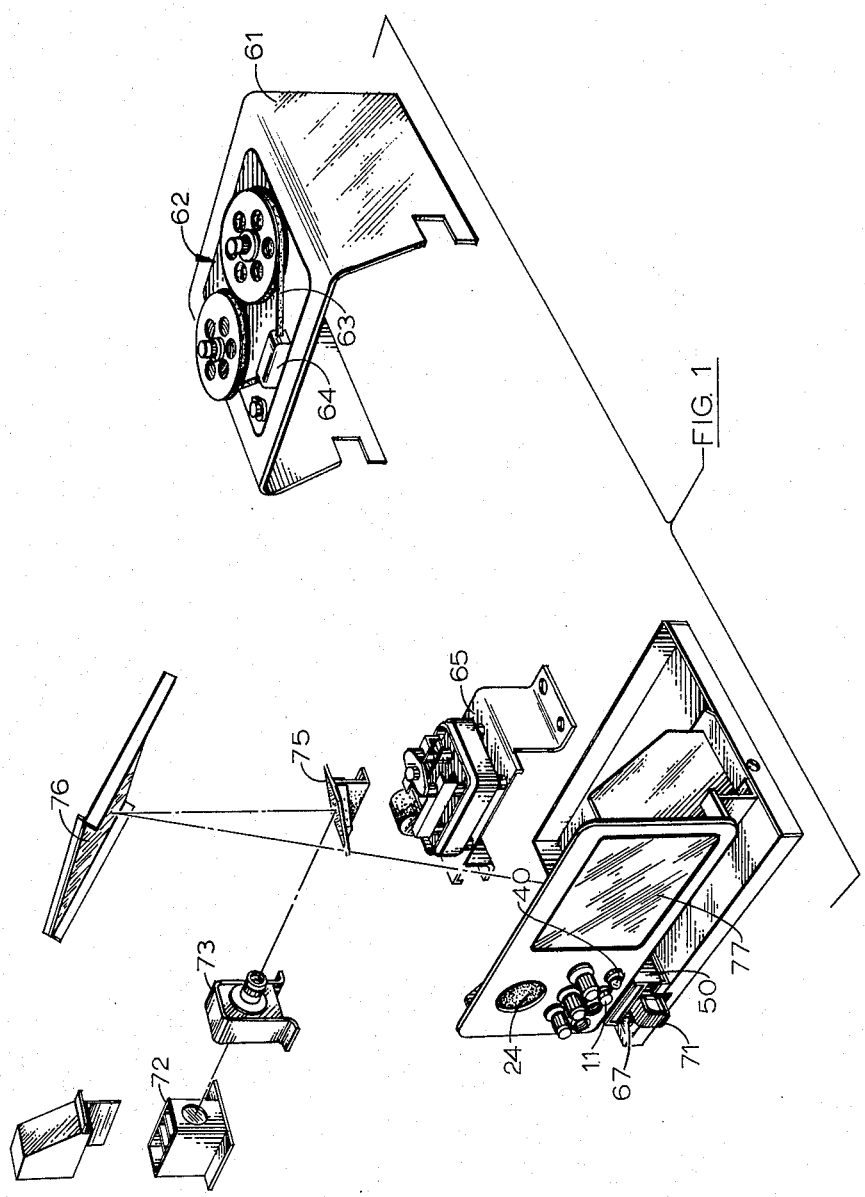
INVENTORS
ROGER C. DE BLOOIS
JACK M. DUER
BY
Edward A. Schwesei
ATTORNEY

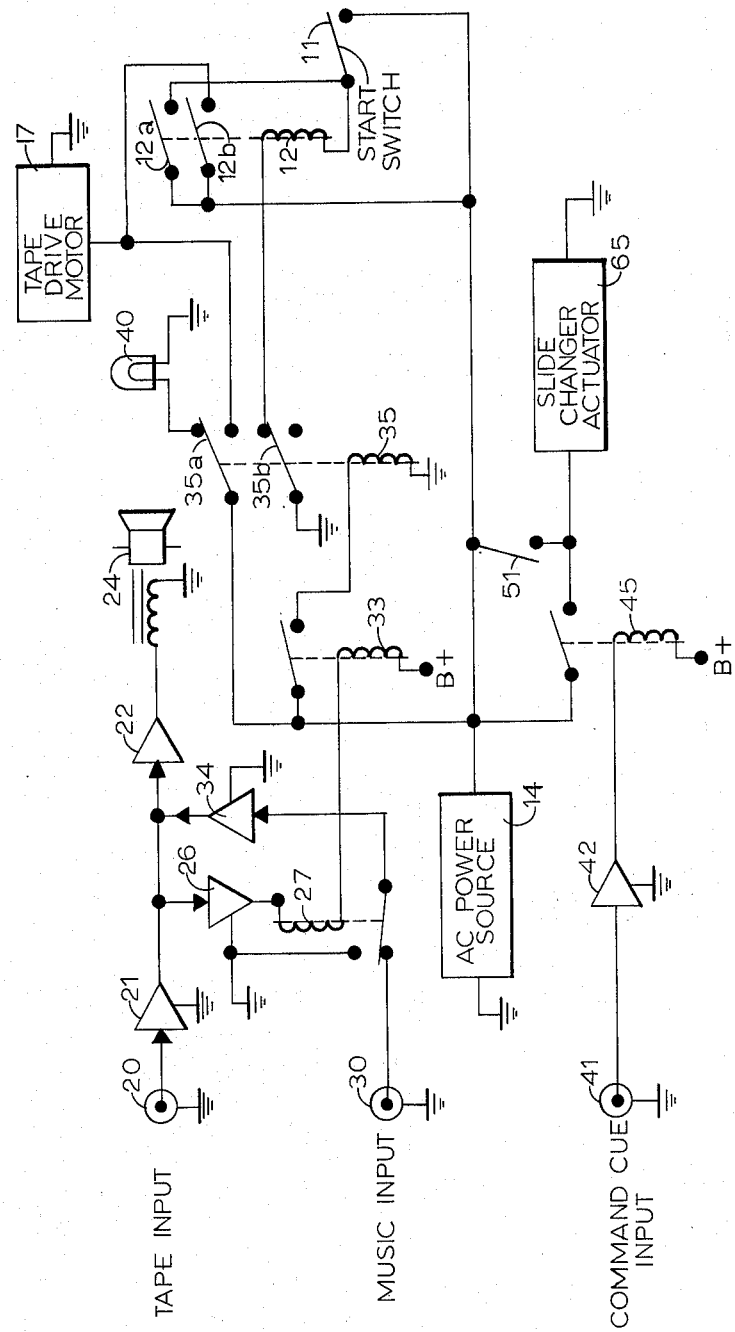

3,245,156
AUDIO-VISUAL DISPLAY SYSTEM
Roger C. De Bloois, Torrance, and Jack M. Duer, Anaheim, Calif., assignors to Northrop Corporation, Beverly Hills, Calif., a corporation of California
Filed Sept. 23, 1963, Ser. No. 310,680
3 Claims. (Cl. 35—8)

This invention relates to an audio-visual display system and more particularly to such a system which is portable and self-contained and is suitable for use as a training and briefing aid.

In training and briefing personnel, it is highly desirable to record the training information both visually and orally and then play back the coordinated video and audio information to the personnel involved. Such co-ordinated video and audio training information is most generally presented on a sound film or a set of slides operating in conjunction with an audio recording or the like. Such prior art systems have the disadvantage of the requirement for bulky and cumbersome units and the necessity for display in a darkened room where the information must be absorbed mentally and later utilized.

Experience has indicated that it is highly desirable to learn by doing, i.e. to go through the operations involved while actually being instructed on how to accomplish such operations. This type of learning is unfeasible with prior art audio visual systems, firstly because the systems utilized require display in a special projection room away from where the operations can be performed and secondly, because with such systems no provision is made for the person receiving the instructions or training to control the presentation of information to his own learning rate. Prior art devices also fail to provide flexibility of operation to enable utilization in various types of situations.

The device of this invention overcomes the shortcomings of prior art audio-visual display systems in providing a simple, compact and portable unit which integrally combines the mechanisms for a coordinated audio-visual presentation. Provisions are made in the device of the invention to enable the person utilizing the system to perform operations as the instructions for same are being presented. The operator can control the presentation of such information so that it coincides with his actual performance of the operations in question. A unique control system is utilized whereby the presentation of visual information is controlled by a programmed command cue audio signal fed through a command signal channel. When there is no audio instructional information being presented, the system automatically feeds music through the audio instructional channel. Means are provided for automatically stopping the presentation of audio and visual information when there is an interruption of information on the audio instructional channel for a predetermined minimum period of time.

It is therefore an object of this invention to provide an improved audio-visual display system.

It is a further object of this invention to provide an audio-visual display system suitable for training personnel while such personnel are actually performing operations to be taught.

It is still a further object of this invention to facilitate the briefing and training of personnel.

It is still another object of this invention to provide an improved audio-visual display system of simple and compact construction.

It is still a further object of this invention to provide an audio-visual display system in which the operator can control the rate of presentation to his own rate of learning.

Other objects of this invention will become apparent from the following description taken in connection with the accompanying drawings of which—

FIG. 1 is an exploded perspective view of a preferred embodiment of the device of the invention, and FIG. 2 is a schematic diagram showing the control system which is utilized in the device of the invention.

Referring now to FIG. 1, a perspective view of a preferred embodiment of the device of the invention is shown. Mounted on top of case 61 is a magnetic tape play-back system 62. The instructional material and command cue signals are recorded on tape 63 and played through separate channels in the system. The instructional signal and the cue signal each is separately picked up by one of the channels of dual magnetic pickup 64 and amplified in an appropriate amplifier unit (not shown) contained within the case. The output of the amplifier for the instructional material is fed to loudspeaker 24.

The visual instructional material is contained on slides 67 which are housed in slide changer assembly 50. The slides in slide changer assembly 50 are advanced by means of slide changer actuator assembly 65 which includes a solenoid actuator which operates in response to the cue signals received in the command signal channel. The slide changer assembly may be a commercially available automatic slide changer such as for example, the automatic slide changer manufactured by the Airequipt Manufacturing Co., New Rochelle, New York.

The slides 67 are placed between condenser assembly 72 which has a light bulb (not shown) therein and projection lens 73. The image on the slide is reflected from mirror 75 onto mirror 76 and thence onto ground glass viewing screen 77.

Simultaneous commencement of operation of both the tape transport mechanism and the slide changer are initiated by pressing "start" switch 11. At the completion of a particular predetermined instructional portion, as indicated by a predetermined lapse in the recording on tape 63, the operation of the slide changer 50 and of the tape playback system is automatically halted. Such cessation of operation is indicated by the lighting of pilot lamp 40. When the operator is ready, the operation can be resumed by again pressing the "start" switch 11. The details of how such operation is accomplished are explained in connection with FIG. 2.

Referring now to FIG. 2, a schematic diagram of the control system used in the device of the invention is illustrated. The output of one of the channels of magnetic playback head 64 which includes audio instructional information (FIG. 1) is fed to receptacle 20 and thence amplified in amplifiers 21 and 22. The output of amplifier 22 is fed to loudspeaker 24. The output of the other channel of playback head 64 which includes command cue information is fed to receptacle 41 and thence amplified in amplifier 42.

The operation of the device is commenced by the operator's momentary closing of start switch 11. This momentarily supplies A.C. power from power source 14 to relay coil 12, thereby causing both of the contacts of this relay to close. Relay contact 12a connects A.C. power to relay coil 12, thereby latching this relay in the closed position and holding it closed even after switch contact 11 has been released. With the contacts 12b of relay 12 closed, A.C. power is supplied from A.C. power source to tape drive motor 17 thereby actuating this motor and commencing the transport of the tape 63 across playback head 64 (see FIG. 1). Output signals on the tape are thereby fed to receptacles 20 and 41 to provide audio instructional information and cue commands to advance the slides.

The output of amplifier 21 drives amplifier 26 into conduction. The B+ supply for amplifier 26 is fed through the coils of relays 27 and 33. The output stage of amplifier 26 is normally cut off, but with an input signal fed thereto, it commences conducting, thereby actuating relays 27 and 33. The contacts of relay 27 are in the position indicated in FIG. 2 in the absence of any input signal to receptacle 20. Under these conditions, a music input signal appearing at receptacle 30 is fed through the contacts of relay 27, amplified by amplifier 34 and thence fed through amplifier 22 to loudspeaker 24.

With an input signal containing instructional information at receptacle 20, however, relay 27 is actuated with the conduction of the output of amplifier 26, and the input to amplifier 34 is grounded, thereby cutting off the music input. The combined time constant of amplifier 26 and relay 27 are designed so that an interruption in the audio signals received at receptacle 20 of at least a few seconds will be necessary to cause relay 27 to be effectively deactuated. Thus, whenever there is no input signal at receptacle 20 for the predetermined minimum time period, music will be played through the system.

As already noted, when amplifier 26 receives a signal, relay 33 as well as relay 27 is actuated. With the contacts of relay 33 closed, A.C. power from power source 14 is supplied to relay 35. With relay 35 actuated, contact arms 35a and 35b are drawn into contact with their associated fixed contacts. With arm 35b in the down position, the ground return for relay coil 12 is removed, and this relay is released. This would normally effectively remove the power to tape drive motor 17 (contact arm 12b being released) except that contact arm 35a, now in the down position, alternatively supplies such power. In this manner, relay 12 is automatically unlatched and prepared for the next "start" sequence. With contact arm 35a in the down position, A.C. power is also removed from pilot lamp 40 thereby extinguishing this lamp. Tape drive motor 17 is thus kept going despite the unlatching of relay 12.

In the operation of an operative embodiment of the device, when a particular information sequence has been completed, which is indicated by a blank portion on the tape input to receptacle 20 of from 3 to 6 seconds, amplifier 26 ceases to conduct and consequently relays 27 and 33 are released. This permits music input from receptacle 30 to be fed through the contacts of relay 27 into the system, so that it can be played on loudspeaker 24 as already described. With the opening of the contacts of relay 33, relay 35 is de-energized, thereby simultaneously feeding A.C. power to lamp 40, causing this lamp to go on, and cutting off such power to tape drive motor 17, thereby causing the tape transport mechanism to stop. With the stopping of the tape tranpsort mechanism, audio information and command cue information to receptacles 20 and 41 respectively ceases. Hence, the presentation of audio instructional information and the advancement of the slides is interrupted.

The ground connection is restored to relay 12 through contact arm 35b, but as this relay has been unlatched, as already explained, it remains open, ready to be closed with the actuation of start switch 11. Music thus will be continued to be played into the system until the operator is ready to receive additional information, at which time, with the actuation of start switch 11, the entire operation is repeated. Thus, the instructional sequences are effectively programmed merely by leaving appropriate blanks in the tape recording.

The slides are advanced on cue by the command cue input fed from the command cue tape recorder channel to input terminal 41. This input which is synchronized with the tape input signal fed to receptacle 20 may use, for example, a short 1,000 cycle tone signal. This signal is appropriately filtered and amplified in amplifier 42 and fed therefrom to actuate relay 45. Power is supplied from A.C. power source 14 to slide changer actuator 65 when the contacts of relay 45 are closed in response to a command cue signal, thereby advancing the slides. If so desired, slide changer actuator 65 may be operated manually by momentarily closing switch 51.

Thus the device of the invention provides a simple yet effective means for controlling the simultaneous presentation of audio and visual instructional information at the control of the person receiving such information.

A unique control system is provided to enable the most effective utilization for instructional purposes and to provide background music during the intervals when audio instructional information is not being presented.

Although the device of the invention has been described and illustrated in detail, it is to be clearly understood that this is intended by way of illustration and example only and is not to be taken by way of limitation, the spirit and scope of this invention being limited only by the terms of the following claims.

We claim:
1. An audio-visual display system comprising
a case,
magnetic playback means mounted on said case for presenting audio information and command cue signals, said means for presenting audio information including a magnetic tape transport mechanism,
means for presenting visual information mounted within said case, said means for presenting visual information including an optical display system and a slide changer mechanism, said slide changer mechanism being responsive to said command cue signals, and
means for controlling and coordinating the presentation of said audio and visual information comprising a power source, manually operable switch means for simultaneously initiating the presentation of said audio and visual information, audio responsive switch means for assuming control of the presentation of said information when audio information appears and for automatically stopping the presentation of said information when there is a predetermined minimum time lapse in the arrival of said audio information, said manually operable switch means being adapted to re-initiate presentation of said audio and visual information,
said manually operable switch means including a start switch connected to said power source, a start relay for connecting power from said power source to drive said tape transport mechanism when said start switch is momentarily actuated, said start relay having an actuator coil connected to said start switch and latching contact means for keeping said start relay actuator coil energized after momentary actuation of said start switch, said audio responsive switch means including relay means for connecting power to drive said tape transport mechanism in response to audio information signals, said relay means including contacts interposed between said power source and the actuator coil of said start relay for removing power from said start relay when said audio information signals are present,
whereby the coordinated audio and visual information is presented simultaneously at a rate which is controlled by the operator.
2. An audio-visual display system comprising
a case,
a power source,
magnetic playback means having a tape transport system driven by said power source for presenting audio information, said playback means being mounted on said case, said playback means including an audio instructional channel and a command cue channel,
means for presenting visual information mounted within said case, said means for presenting visual information including an optical display system and a slide changer mechanism, said slide changer mechanism operating in response to the output of said command cue channel, and means for controlling and coordinating the presentation of said audio and visual information comprising manually operable switch means for simultaneously initiating the presentation of said audio and visual information, audio responsive switch means for assuming control of the presentation of said information and for automatically stopping the presentation of said information when there is a predetermined minimum time lapse in the arrival of said audio information, said manually operable switch means being adapted to re-initiate the presentation of said audio and visual information in response to manual actuation thereof, said manually operable switch means including a start switch connected to said power source, a start relay for connecting power from said power source to drive said tape transport system when said start switch is momentarily actuated, said start relay having an actuator coil connected to said start switch and latching contact means for keeping said start relay actuator coil energized after the momentary actuation of said start switch, said audio responsive switch means including relay means for connecting power to drive said tape transport system in response to audio information signals, said relay means including contacts interposed between said power source and the actuator coil of said start relay for removing power from said start relay when said audio information signals are present, whereby the coordinated audio and visual information is presented simultaneously at a rate which is controlled by the operator.

3. Control means for an audio-visual presentation system, said system including an optical display device operating in conjunction with a slide changer and a magnetic tape playback device having an audio information channel and a command cue channel comprising command cue control means responsive to the output of said command cue channel for actuating said slide changer, a power source, manual switch means for commencing the operation of said tape playback device, and audio responsive switch means responsive to the output of said audio information channel for assuming control of the operation of said tape playback device and automatically stopping said tape playback device when there is an interruption in audio signals in said audio information channel for a predetermined minimum time interval, said manual switch means being adapted to re-commence the operation of said tape playback device in response to a manual actuation thereof, said manual switch means including a start switch connected to said power source, a start relay for connecting power from said power source to drive said tape playback device when said start switch is momentarily actuated, said start relay having an actuator coil connected to said start switch and latching contact means for keeping said start relay actuator coil energized after momentary actuation of said start switch, said audio responsive switch means including relay means for connecting power to drive said tape playback device in response to audio signals in said audio information channel, said relay means including contacts interposed between said power source and the actuator coil of said start relay for removing power from said start relay when said audio signals are present.

References Cited by the Examiner

UNITED STATES PATENTS

| | | | |
|---|---|---|---|
| 2,252,327 | 8/1941 | Lovett et al. | 179—100.11 |
| 2,340,863 | 2/1944 | Carpenter et al. | 179—100.11 |
| 2,975,672 | 3/1961 | Shields | 35—8.1 |
| 2,985,069 | 5/1961 | Sampson | 35—8.1 |
| 3,177,767 | 4/1965 | Templeman | 88—28 |
| 3,187,626 | 6/1965 | Mindell et al. | 88—28 |

EUGENE R. CAPOZIO, *Primary Examiner.*

LAWRENCE CHARLES, *Examiner.*

WILLIAM H. GRIEB, *Assistant Examiner.*